(12) United States Patent
Portner et al.

(10) Patent No.: US 10,419,486 B1
(45) Date of Patent: Sep. 17, 2019

(54) ENHANCING ENTERPRISE SECURITY ON MOBILE PLATFORMS

(71) Applicant: The MITRE Corporation, McLean, VA (US)

(72) Inventors: Joseph Portner, Hampton, VA (US); Colin Courtney, Suffolk, VA (US); David Bryson, Mathews, AL (US); Sarah Ford, Virginia Beach, VA (US); Collin McRae, Midlothian, VA (US)

(73) Assignee: The MITRE Corporation, McLean, VA (US)

( * ) Notice: Subject to any disclaimer, the term of this patent is extended or adjusted under 35 U.S.C. 154(b) by 270 days.

(21) Appl. No.: 15/290,979

(22) Filed: Oct. 11, 2016

(51) Int. Cl.
*H04L 29/00* (2006.01)
*H04L 29/06* (2006.01)
*G06F 8/65* (2018.01)

(52) U.S. Cl.
CPC .......... *H04L 63/20* (2013.01); *G06F 8/65* (2013.01); *H04L 63/06* (2013.01); *H04L 63/10* (2013.01)

(58) Field of Classification Search
CPC ......... H04L 63/20; H04L 63/06; H04L 63/10; G06F 8/65; G06F 21/10
See application file for complete search history.

(56) References Cited

U.S. PATENT DOCUMENTS

| 2006/0288420 | A1* | 12/2006 | Mantripragada | ....... G06F 21/51 726/25 |
| 2012/0096392 | A1* | 4/2012 | Ording | ................ G06F 9/451 715/783 |
| 2016/0092248 | A1* | 3/2016 | Shani | ................ G06F 9/45558 718/1 |
| 2017/0076103 | A1* | 3/2017 | Chen | .................. G06F 21/629 |

* cited by examiner

*Primary Examiner* — Jeffrey C Pwu
*Assistant Examiner* — Helai Salehi
(74) *Attorney, Agent, or Firm* — Morrison & Foerster LLP

(57) ABSTRACT

Systems and methods for managing and implementing secure runtime software hooking on devices are provided. The system and method disclosed includes components and features that enable enterprises and organizations to securely manage mobile devices that have access to the organization's data and network resources. Various embodiments provide for secure systems and methods to modify a behavior of an operating system or one or more applications, without having to flash or modify the Read-only Memory (ROM).

17 Claims, 14 Drawing Sheets

ENHANCING ENTERPRISE SECURITY ON MOBILE PLATFORMS

BACKGROUND

Enterprises today are challenged with deploying secure mobile devices and implementing customized features on a growing number of diverse mobile platforms. While mobile platforms are rapidly evolving, software update cycles of the Original Equipment Manufacturers (OEMs) or operating system developers (e.g., Apple, Google, etc) may be sporadic. Thus, governments and enterprises cannot always depend on these third parties for timely updates or security patches. Furthermore, mobile platforms such as embedded systems (e.g., mobile and Internet-of-Things (IoT) devices) have operating systems (OS) that are tightly coupled with their hardware, and are thus inherently challenging to maintain and keep secure. Consequently, it is especially challenging to customize and tailor a mobile OS to the needs of each private or public organization.

SUMMARY

A need exists for organizations or enterprises to rapidly develop and seamlessly provide customized security and feature updates on mobile devices which may, for example, have access to the organizations' resources (e.g., data or networks). Provided herein are systems, methods, and devices that may improve enterprise-level device management capabilities and device-level feature and security policy customization.

A "Service Layer"—which may comprise modular application layer components and a runtime component (e.g., an anchor)—can be incorporated into an operating system framework. One or more modular components of the Service Layer may provide each organization the ability to utilize software hooks to flexibly alter the functionality of any mobile device without flashing or modifying the Read-only Memory (ROM) on mobile devices. Furthermore, the Service Layer can help organizations to securely change the behavior of system and applications (apps) without, for example, directly altering a compiled code (e.g., Android Application Package (APK)) of any particular application.

Some exemplary embodiments may include a method of modifying a behavior of a software application at runtime on a computing device having at least one processor. The method may include: (a) executing an initialization instruction for the computing device, whereby the initialization instruction causes the processor to create a parent process modified to load one or more software modules comprising software hooks, wherein the software hooks are loaded into a memory of the computing device; (b) launching the software application by executing a fork instruction on the modified parent process, thereby creating a child process that includes instructions associated with applying the one or more software hooks, wherein the fork instruction creates a copy of the modified parent process; (c) loading into the memory of the computing device an executable file that is associated with the software application; (d) identifying hook targets from loaded components of the executable file, wherein the identification is based on the instructions associated with applying the one or more software hooks; and (e) applying the one or more software hooks to the hook targets, thereby replacing the identified hook targets with the one or more software hooks.

According to one aspect of some embodiments, the method of modifying a behavior of a software application at runtime on a computing device having at least one processor may further comprise loading a digital certificate into the memory, prior to launching the software application, wherein the digital certificate is used to verify code signatures of the one or more software modules. According to another aspect of some embodiments, the above method may further include verifying each of the one or more software modules, loading into the memory software hooks associated with the verified software modules. According to still another aspect of some embodiments, the code signature may be verified using a secure public key infrastructure (PKI).

According to an aspect of some embodiments, the method of modifying a behavior of a software application at runtime on a computing device having at least one processor may further comprise: detecting a new or updated software module in a remote software module repository, wherein the remote software module repository is communicatively coupled to the computing device; and installing the new or updated software module on the computing device. According to another aspect of some embodiments, the computing device may be a mobile device. The mobile device may be an Android device running an Android operating system.

Other exemplary embodiments may include a system, comprising (a) one or more processors; and (b) a memory coupled to the processors comprising instructions executable by the processors to modify the behavior of a software application at runtime on an operating system installed on a computing device, the processors being operable when executing the instructions to: execute an initialization instruction for the computing device, whereby the initialization instruction may cause the processor to create a parent process modified to load one or more software modules comprising software hooks, wherein the software hooks are loaded into a memory of the computing device; launch the software application by executing a fork instruction on the modified parent process, thereby creating a child process that includes instructions associated with applying the one or more software hooks, wherein the fork instruction creates a copy of the modified parent process; load into the memory of the computing device an executable file that is associated with the software application; identify hook targets from loaded components of the executable file, wherein the identification is based on the instructions associated with applying the one or more software hooks; and apply the one or more software hooks to the hook targets, thereby replacing the identified hook targets with the one or more software hooks.

Other exemplary embodiments may include at least one non-transitory computing device-readable medium comprising instructions stored thereon, wherein the instructions, in response to execution by a computing device, may cause the computing device to: execute an initialization instruction for the computing device, whereby the initialization instruction causes the processor to create a parent process modified to load one or more software modules comprising software hooks, wherein the software hooks are loaded into a memory of the computing device; launch the software application by executing a fork instruction on the modified parent process, thereby creating a child process that includes instructions associated with applying the one or more software hooks, wherein the fork instruction creates a copy of the modified parent process; load into the memory of the computing device an executable file that is associated with the software application; identify hook targets from loaded components of the executable file, wherein the identification is based on the instructions associated with applying the one or more software hooks; and apply the one or more software hooks to the loaded components of the executable file, thereby replacing the identified hook targets with the one or more software hooks.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Introduction

The Service Layer may benefit enterprise level device management—of both mobile and non-mobile devices—in the following ways: enterprises or organizations may: 1) configure devices to dynamically (e.g., at runtime) replace existing code or inject custom code onto devices; 2) rapidly modify devices and their associated OS with manual or automated updates; 3) modify multiple applications with a single update; 4) provide additional level of security by assuring that only trusted code may be activated as a software hook; and 5) introduce additional fine-grained administrative control in each user device.

For example, an organization may enforce specific security protocols across all devices that may be associated with the organization by updating its policy settings. Devices with the service layer components installed may be automatically updated with new security features or functionality without any user input or interaction. Organizations may also safely deploy custom updates while ensuring that the deployed code is not tampered with, by providing device level verification of software codes that may be downloaded onto the devices.

Service Layer Components and the Software Stack

Service Layer components can be implemented for one or more different configurations of software stacks. A software stack can include installable files and software definitions for software products, software patches, and other software stacks. The software stack may comprise multiple layers such as, for example, a bottom layer (e.g., core of the operating system), a middleware layer, and a top layer (e.g., applications layer). The middleware layer may comprise one or more additional layers, and provide service to the software applications beyond those available from the bottom layer (e.g., core of the operating system). The Service Layer components may reside in (or be part of) one or more of these layers in the software stack. For example, one or more of the Service Layer components may be part of the of the application layer, and may be installed as modular application layer components. Other Service Layer components may be part of the middleware layer.

Figure 1:
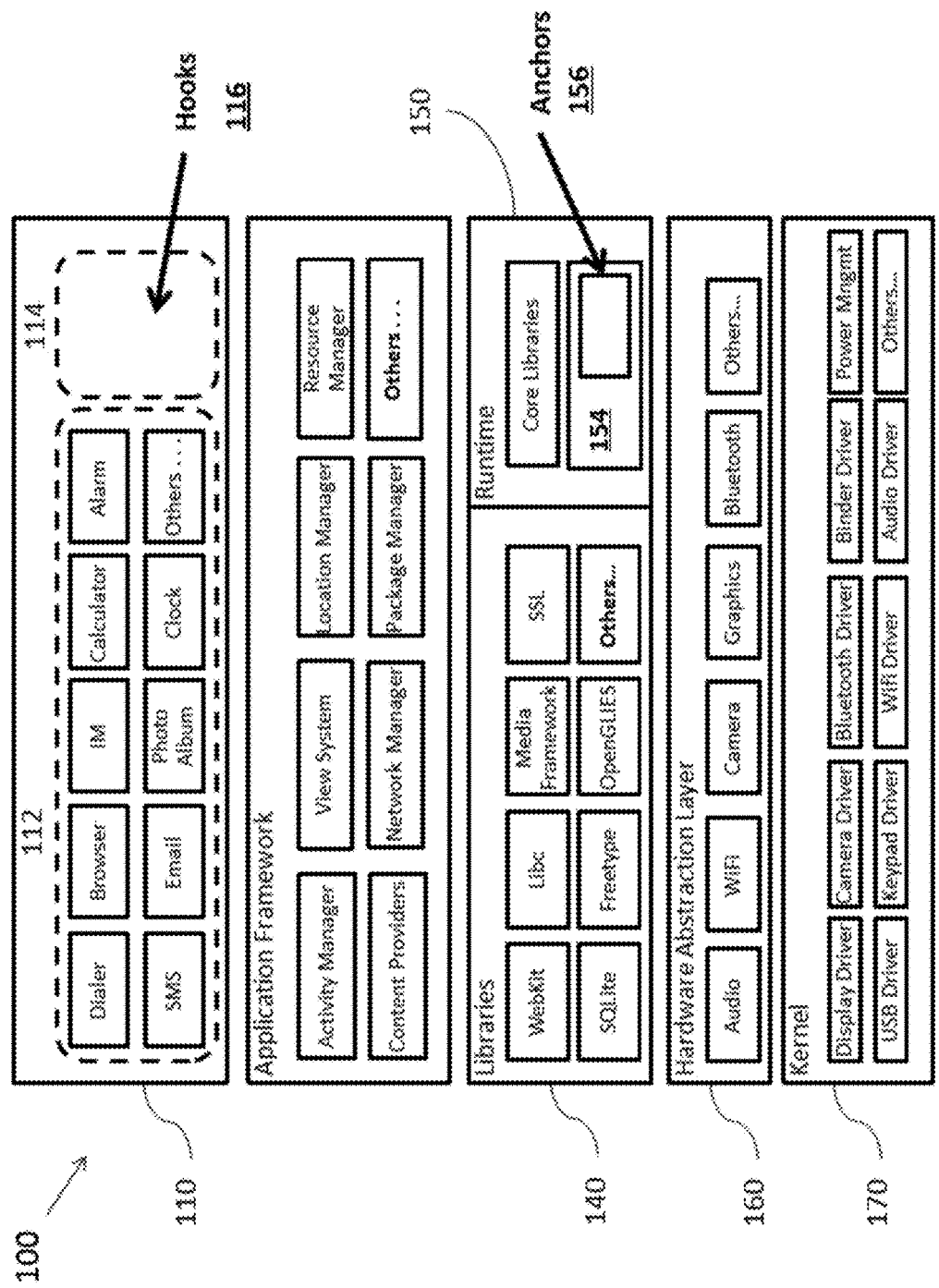
FIG. 1 is a schematic diagram illustrating a Service Layer for a mobile OS in accordance with some embodiments described herein.

FIG. 1 is a schematic diagram illustrating the Service Layer concept for a software stack in accordance with some embodiments described herein. The illustrated software stack 100 may represent a mobile OS environment. In one embodiment, the software stack 100 may represent the Android platform. The software stack may comprise one or more of the Application layer 110, middleware layer, and a bottom layer. The application layer 110 may include one or more applications 112 that either come preinstalled with the device or may be downloaded and installed later. Examples of applications 112 may include, but is not limited to, a dialer, SMS, email applications, a browser (e.g., Android Browser, Chrome Browser, Firefox, etc.), IM, photo album, calculator, alarm, and others that may be configured to run on a mobile device. The middleware layer may further comprise Libraries 140 and the Runtime 150; and the bottom layer of the software stack may be a Kernel 170 (e.g., Linux Kernel).

In some embodiments, the Service Layer components are installed on (or are part of) the mobile device. For example, one or more Service Layer components may be installed in the application layer 110, and other components may be loaded in the middleware layer such as, for example, the Runtime 150. The Service Layer components may comprise software hooks and anchors. Software hooks may be associated with one or more of the modular application layer components (e.g., modular components installed in the application layer), and the anchor may be associated with components loaded onto the Runtime. After the system is booted or during the system boot process, the software hooks 116 and anchors 156 may be loaded onto the memory of the mobile device. The software hooks may operate in conjunction or in combination with the anchor to provide secure Service Layer functionality for the device user.

For example, software hooks 116 may be introduced in the application layer 110 of the software stack. Similar to how other software applications (apps) may be installed in the application layer 110, one or more software hooks may be introduced in the application layer by installing one or more modular components of the Service Layer. The software hooks may later be loaded onto the runtime environment 150 at a particular point in time after, or during, the system boot. The anchor 156 may also be loaded onto the runtime environment 150. In some embodiments, the anchor is loaded during the system boot. Alternatively, the anchor may be loaded after the system boot, loaded with each application start, or may be loaded before the start of each application, and serve as entry points for the software hooks 116 at a later time.

Before any software hooks can be applied to one or more applications, the anchors may be configured to verify code signatures of the installed modular components via one or more encryption methods, including, but not limited to, public-key encryption techniques. For example, the anchor checks the code signature of the modular components to ensure that only authorized modules and its associated hooks may be applied to the system or to one or more applications. Unauthorized software hooks may not be loaded into the memory.

Figure 2:
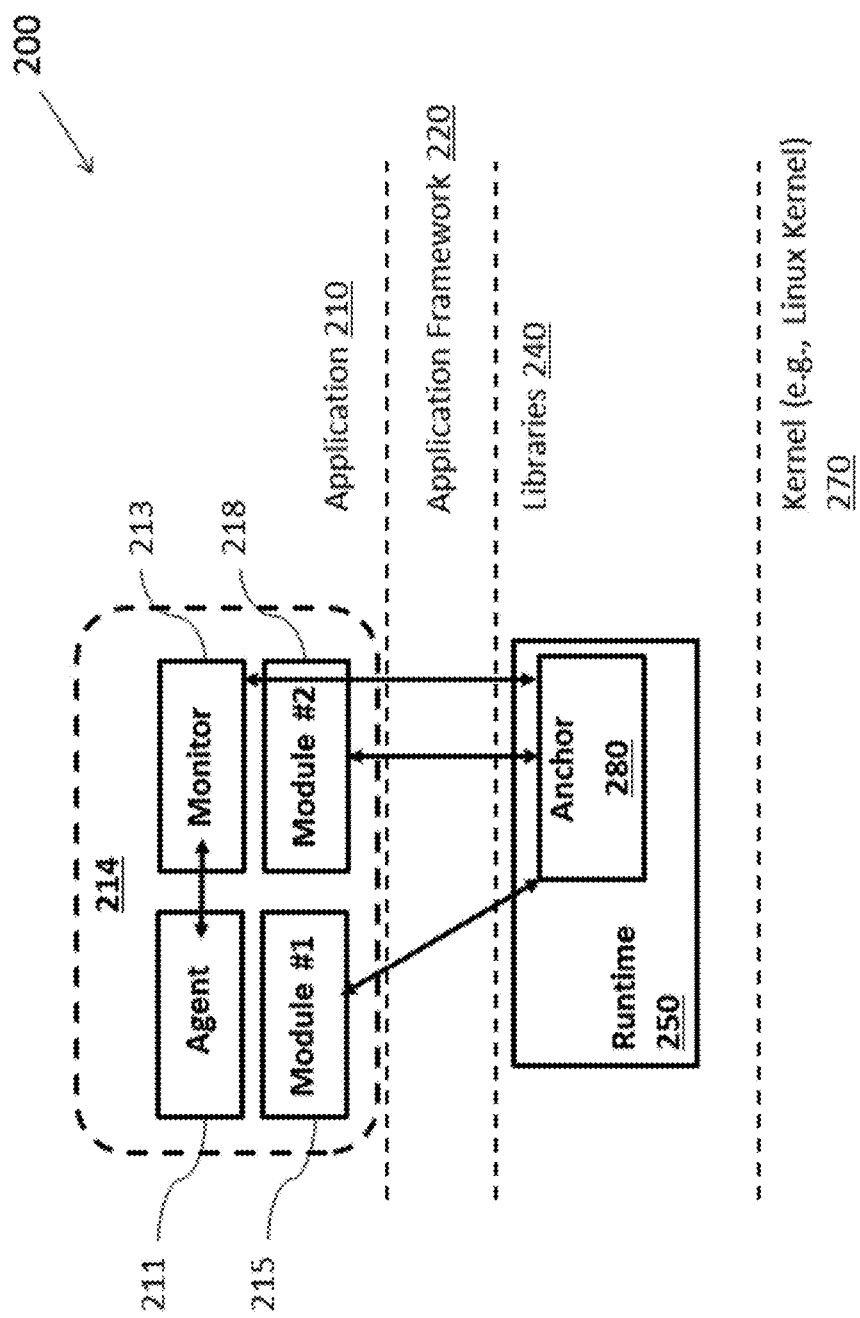
FIG. 2 is a schematic diagram illustrating components of the Service Layer for a mobile OS in accordance with some embodiments described herein.

FIG. 2 is a schematic diagram 200 illustrating components of the Service Layer for one or more types of mobile OS in accordance with some embodiments described herein. The schematic diagram 200 illustrates one configuration of the Service Layer, in which four distinct components are installed on the device: Agent 211, Monitor 213, Service Layer (SL) modules (215 and 218), and the Anchor 280. The four distinct components may be configured to communicate with one another, and/or communicate with other components or layers of the mobile OS.

In one embodiment, the agent 211, monitor 213, and SL module(s) (215 and 218) are modular components of the Service Layer, and may be part of the application layer 110. These components may be installed by, for example, the administrator or by the device user. The anchor 280 may be included or pre-installed in the Read-only Memory (ROM) and loaded in the runtime environment 250 on system boot.

In one embodiment, the anchor may be implemented as a modified binary (e.g., a modified "app_process" binary), which is configured to verify the signatures of the Service Layer components, including the SL modules, and facilitate software hooking. Components of the anchor may also include the Java library and a certificate trust store which may contain certificates that are necessary to validate other certificates.

The agent component 211 may provide one or more of the following functionalities: 1) run as a service on the mobile OS, which means that the agent may start when the device boots, run in the background without user interaction, and/or accomplish device management tasks; 2) provide a graphical user interface (GUI); 3) act as a front-end (or "client") for the Service Layer repository backend (or "server-side"); 4) query other applications on the mobile device, including the other Service Layer components; and 5) install/uninstall or manage SL modules (215 and 218). For example, the user of the mobile device may install one or more SL modules via the GUI of the Agent 211, or may search for other available SL modules that are available for download. In other embodiments, the Agent component 211 may communicate with the backend, and may detect any updates, changes, or modifications in the Service Layer repository. For example, an updated software module or a new software module may be uploaded to the service layer repository. The Agent may be configured to detect such changes. The Agent may then be configured to download and install any one or more updated or newly available SL modules. The Agent may install the modules in the background or may prompt the user to accept the download. The Agent may also be configured to determine which modules, among the SL modules installed on the device, should or should not be activated. The Agent may also deactivate one or more SL modules, in which case the modules and the software hooks included in the modules may not be applied to the device.

The monitor component 213 may provide one or more of the following functionalities: 1) run as a service on the mobile OS, which means that the monitor may (similar to the agent component) start when the device boots, run in the background without user interaction, and/or accomplish device management tasks; 2) utilize software hooks to collect data and log one or more (e.g., anomalous) system activities; 3) transmit data and logs to the Agent component, which may sync the transmitted information with the repository back-end. For example, one or more types of data or system activities may be logged by the monitor component, and may be stored in the repository or shared with the administrator.

SL modules may be installed, for example, via the Agent. The Agent may automatically install SL modules on the device, or may prompt the user to install certain SL modules. Each SL module may contain software hooks that can modify the behavior of the system or one or more target applications. The SL modules may be developed by the organization or one or more third parties, and may be shared with the organization by uploading the SL modules to module repositories.

Figure 3:
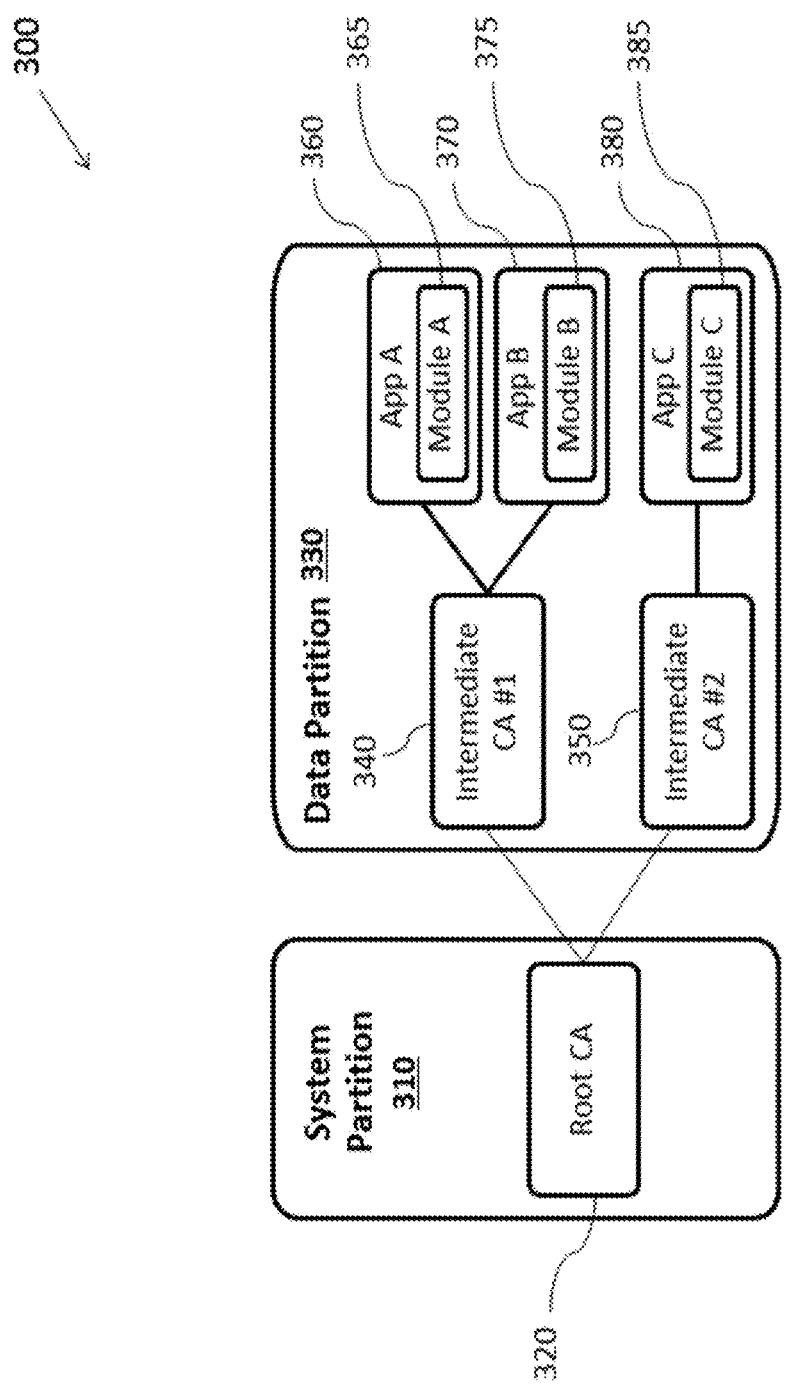
FIG. 3 is an illustration of a chain of trust for the Service Layer in accordance with some embodiments described herein.

FIG. 3 is an illustration of a chain of trust for the security architecture 300 of the Service Layer in accordance with some embodiments described herein. Secure operation of the Service Layer may require a set of role, policies, and procedures needed to create, manage, distribute, use, store, and revoke digital certificates. Digital certificates may provide the basis for authentication, digital signatures, and encryption. In the context of the Service Layer running on a mobile OS, these digital certificates may provide a secure method to verify the authenticity of the various components of the Service Layer. For example, the certificates may be necessary to verify the authenticity of the SL modules that may be distributed and installed on each mobile device. Once the authenticity of an SL module is verified, the software hooks associated with the particular SL module may be applied to the system or one or more apps.

In one embodiment, the Service Layer may rely on verification of signed code using a Public Key Infrastructure (PKI). There may be two types of certificate authorities (CAs): Root CAs (320) and intermediate CAs (e.g., 340 and 350). In order for a certificate to be trusted, the specific certificate must have been issued by a CA that is included, for example, in a trust store of the device. The trust store may serve as the repository or storage space for trusted certificates. If the certificate was not issued by a trusted CA, the device may then check to see if the certificate of the issuing CA was issued by a trusted CA, and repeat this process until either a trusted CA is found (at which point the SL module is verified and the software hooks may be applied) or no trusted CA can be found (at which point the SL module verification process will fail). Depending on whether the verification process for the SL module is successful, the software hooks that may be associated with the SL module may be loaded and applied to a software application or the system.

The Root CA certificate 320 may be installed on the device in the system partition 310, when the ROM is compiled, during provisioning, or at a later time, for example, with a one-time root access. System partition 310 may refer to the partition that contains the entire operating system, other than the kernel and the ramdisk. The system partition 310 may include the user interface as well as the system applications that may come pre-installed on the mobile device. Root access may generally refer to having access to the lowest level of the file system, or having what may be referred to as "super-user" permissions, which enables the person with such permission to modify anything on the system. In some embodiments, the Root CA certificates cannot later be modified without rooting the device and/or unlocking the boot loader.

Intermediate CA certificates (e.g., 340 and 350) may be installed in the agent's (e.g., the agent component 211) application directory, which may be part of the data partition 330. The data partition 330 may contain the user's data such as contacts, messages, settings, and apps that the user may have installed. Intermediate CA certificates may be prepackaged and/or downloaded from a local or remote repository. For example, three applications—App A (360), App B (370), and App C (380)—may be installed on the mobile device. These three applications may be associated with three separate SL Modules-Module A (365), Module B (375), Module C (385). The Intermediate CA certificate #1 (340) may be used to verify the authenticity of Module A (365) and Module B (375), and Intermediate CA certificate #2 (350) may be used to verify the authenticity of Module C. These intermediate CA certificates may have been issued by the Root CA. Once the authenticity of the SL Modules is verified, the software hooks associated with the modules may be applied to the respective applications.

FIGS. 4-8 illustrate methodologies, flow diagrams, or sequence diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Figure 4A:
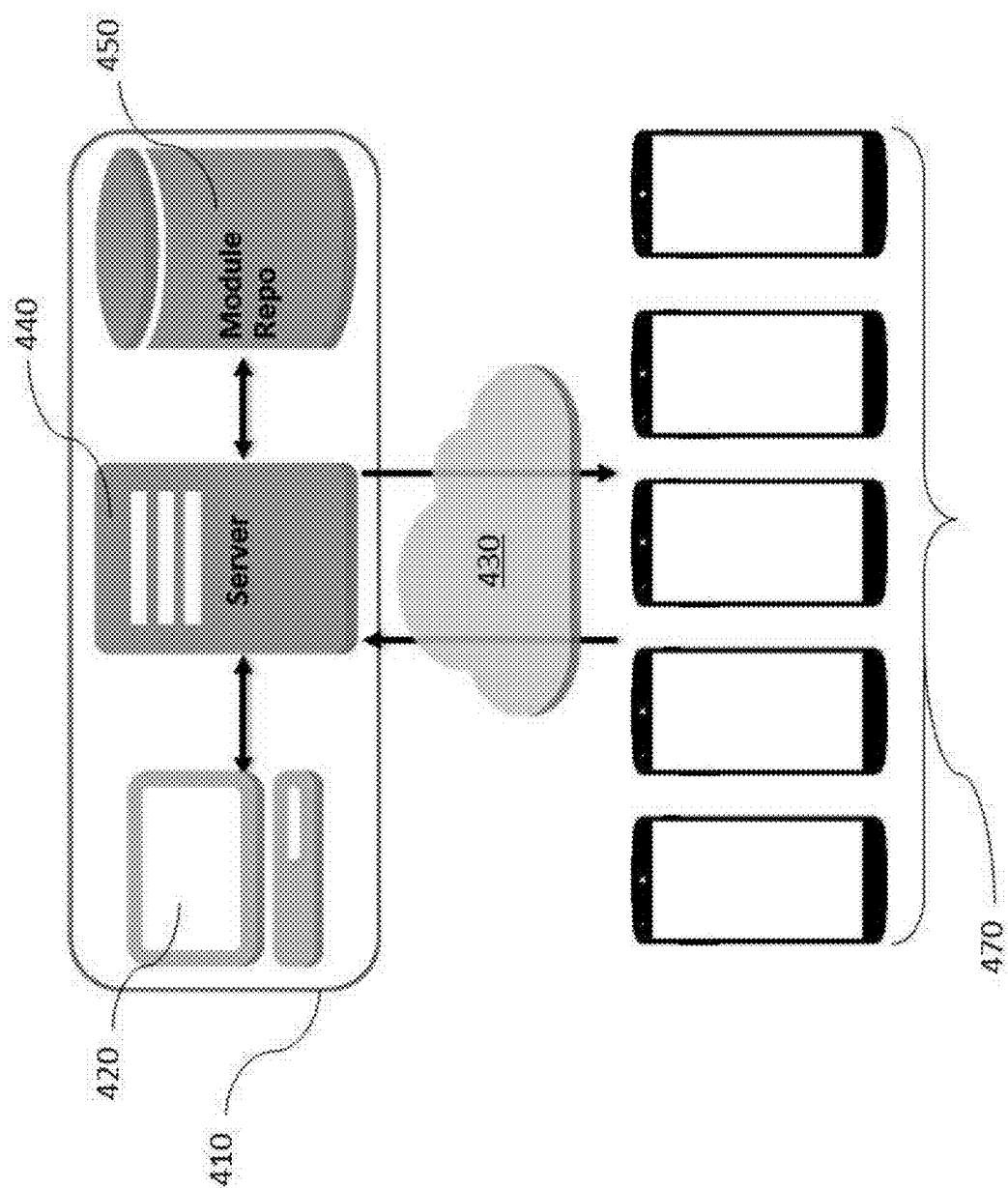
FIG. 4A is an illustration of an architecture for distributing Service Layer modules ("SL modules") in accordance with some embodiments described herein.
Figure 4B:
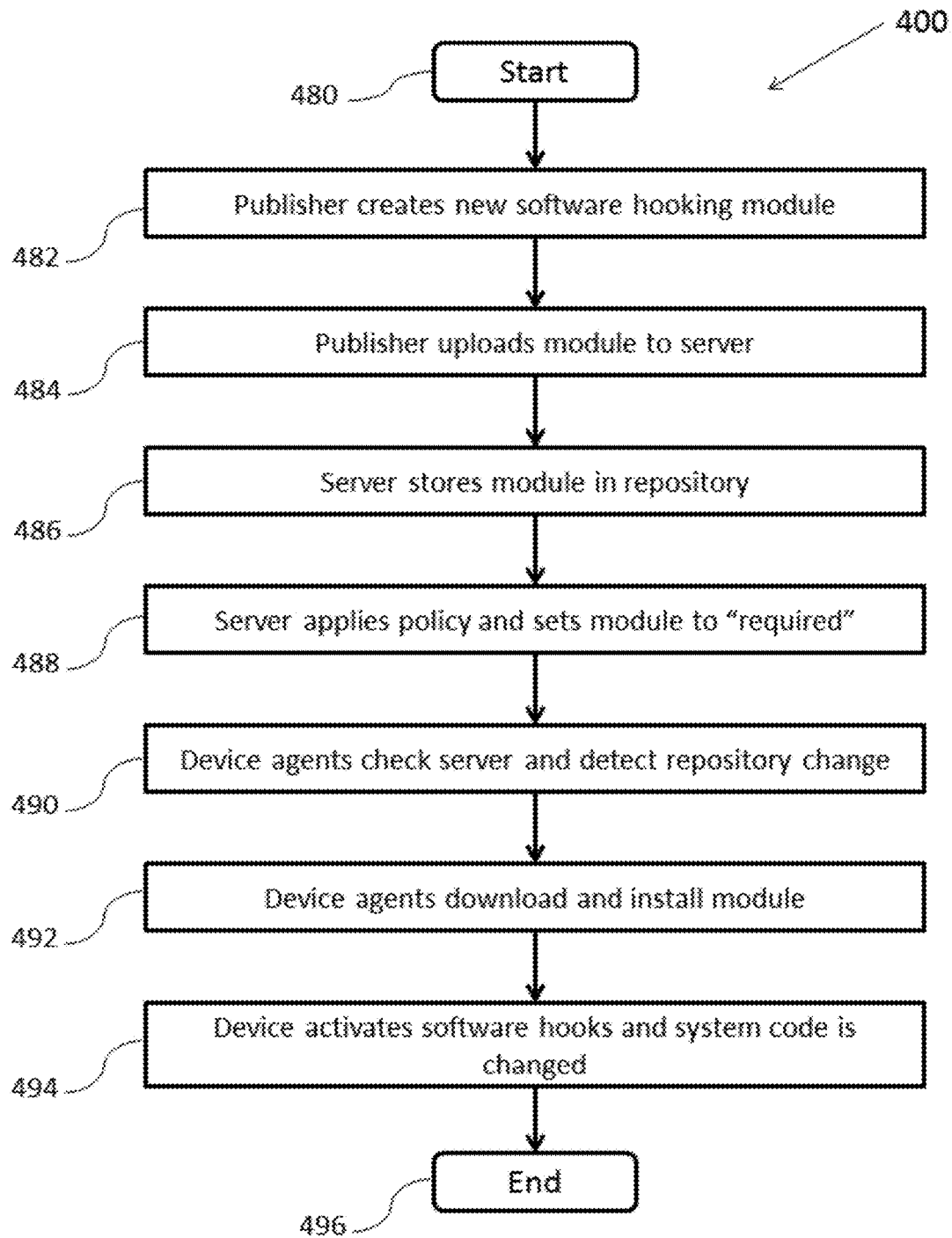
FIG. 4B is a flow diagram illustrating a method for distributing the Service Layer in accordance with some embodiments described herein.

FIGS. 4A-4B illustrate an exemplary method of distributing Service Layer Modules ("SL Modules") in accordance with some embodiments described herein. One or more publishers (e.g., organizations managing the repositories or any third-parties with access) may create a new SL module (Step 482). The SL module may contain software hooks that are configured to customize a mobile device, as described in FIG. 1. Next, the publisher may upload the newly created module to the server 440 (Step 484). In some embodiments, the server may be configured to store the SL module in a database, which may also be referred to as the module repository 450 (Step 486).

In one embodiment, an organization may update its mobile device policy, for example, by setting one or more of the aforementioned module (i.e., stored in the Module Repo 450) to be "required" or "mandatory" by all employees (Step 488). Alternatively, the mobile device policy settings may be fine-grained and control for each group of employees or individual employees. For example, certain policy settings may only be available to certain groups of employees based on their credentials. This may be accomplished by an administrator or anyone who may be in charge of implementing the policy. The administrator or the person managing the server may access, update, modify, or alter an organization's device policy via a management interface 420, which may have a user interface component. The management interface 420 may be in direct communication with the server, or may be coupled to the server. Other policies may be created based on different attributes of the module, including, but not limited to: those submitted by a specific publisher, those that match a search for tagged categories, those that match specific users, those that match specific locations, or those that are identified as providing security patches for software vulnerabilities.

The mobile device 470 agent component may be in communication with the server and may be configured to detect a change or an update in the repository. A change or an update to the module repository may be indicative of a new module that is uploaded or an existing module that may have been updated, or an existing module that may be removed or deleted. Once the agent detects the change, the Service Layer Agent may be configured to download and install the required modules on the relevant devices 470. In some embodiments, the download may happen in the background (e.g., run as a background process) without the involvement of the user of the mobile device 470. In other embodiments, the user of the mobile device 470 may be notified of the updated repository, and may or may not be prompted to download and install the SL module. After the SL modules are installed the device 470 may be configured to verify the modules and activate the software hooks, and as a consequence software hook activation, the system code or one or more applications may be modified (Step 494).

Figure 5A:
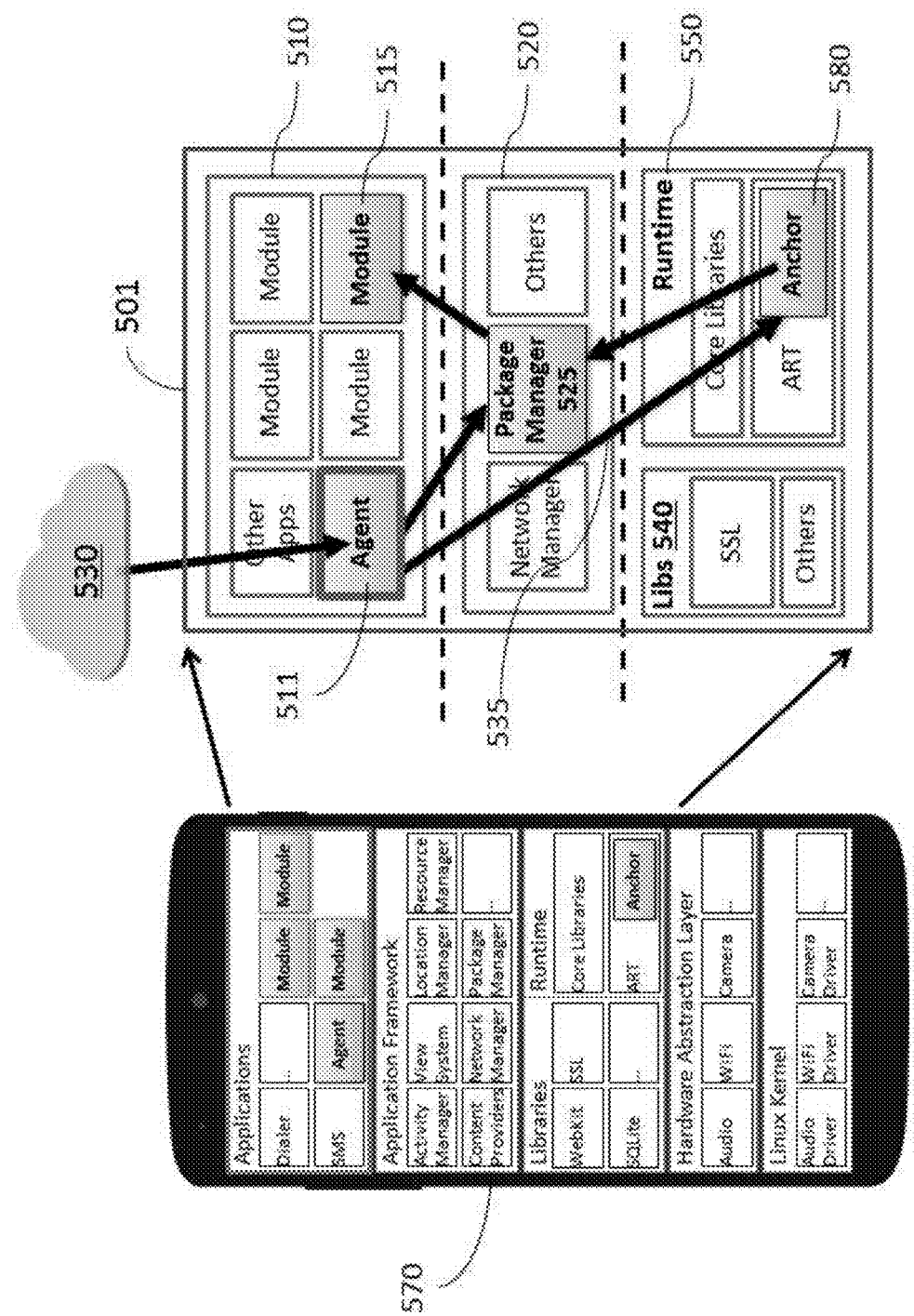
FIG. 5A is an illustration of a method for Service Layer module installation and enumeration in accordance with some embodiments described herein.
Figure 5B:
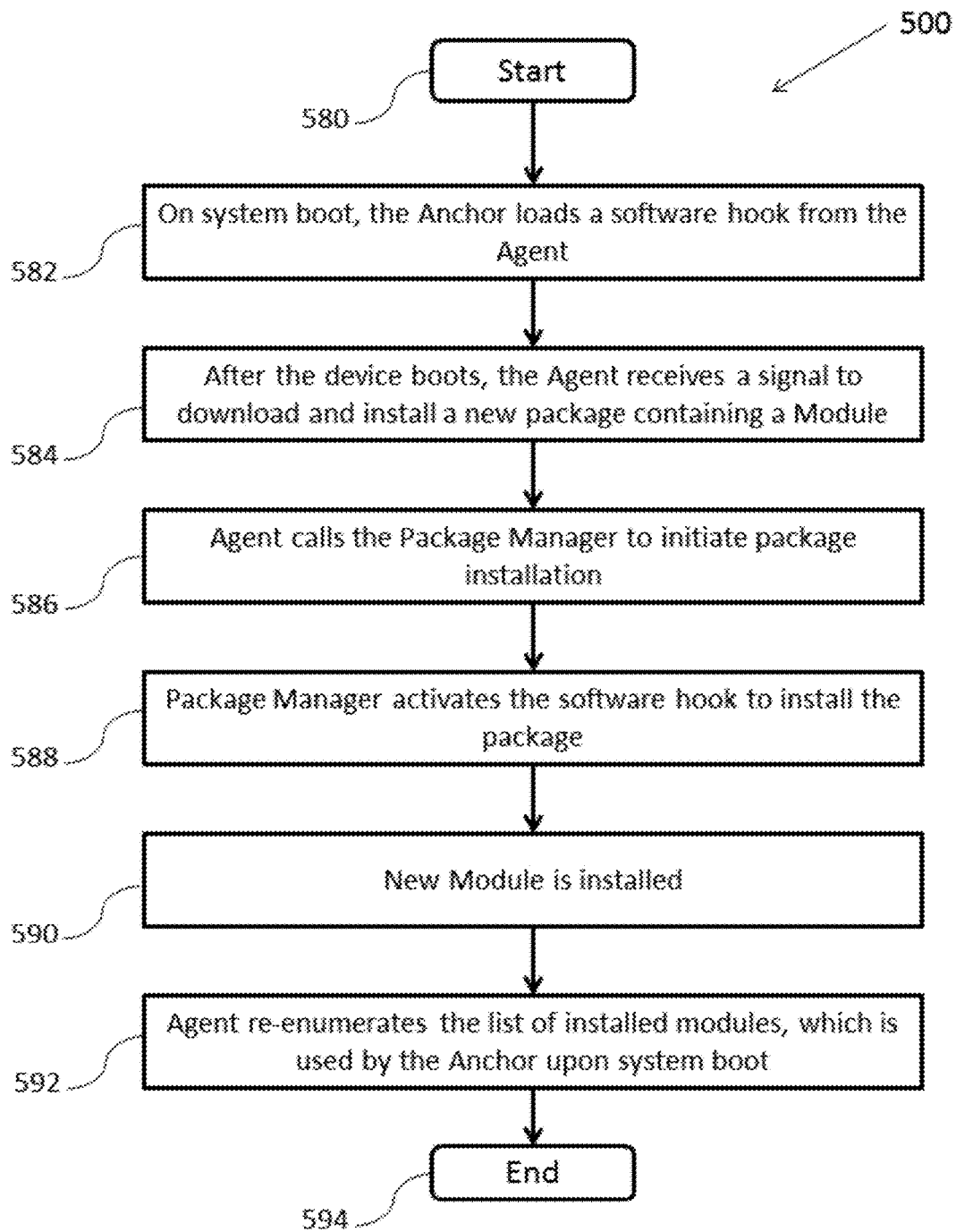
FIG. 5B is a flow diagram of a method for Service Layer module installation and enumeration in accordance with some embodiments described herein.

FIGS. 5A-5B illustrate an exemplary method of installing and enumerating SL Modules in accordance with some embodiments described herein. Referring to FIG. 5A, the software stack illustrated on the left 570 is an embodiment of a mobile software stack, and the figure on the right 501 is an expanded illustration of the software stack layers that are in communication with one or more Service Layer components. The Service Layer may be installed on or in communication with the software stack layer that sits above the hardware abstraction layer or the kernel, the layer which may also be referred to as the middleware layer. For example, the Service Layer may apply to the Applications layer 510, the Applications framework layer 520, the Libraries 540 and the Runtime 550. As illustrated in FIG. 5A, the Agent 511, SL Modules 515, and the Anchor 580 may be installed on the mobile device.

In some embodiments, software hooks that are loaded on or during system boot may be used or activated to install new SL Modules. For example, on system boot, the Anchor 580 may load a software hook according to instructions, either directly or indirectly, from the Agent 511 (Step 582). This step is also illustrated by the arrow 535. After the device boots, the Agent 511 may receive or detect a signal (e.g., notification) from the network 530 to download and install a new package containing a module (Step 584). Next, the Agent may call the package manager 525 to initiate package installation (Step 586). The package manager may then activate the software hook to install the package (Step 588) associated with a new module 515. In some embodiments, the software hooks that are loaded during the device booting sequence may enable automated installation of the package. For example, the new module (515) may be successfully installed, with or without user interaction (Step 590). After the new module is installed, the Agent may re-enumerate the list of installed SL Modules (Step 592). The list of installed SL Modules may then be used by the Anchor (580) upon system boot.

Service Layer Use Case

Figure 6A:
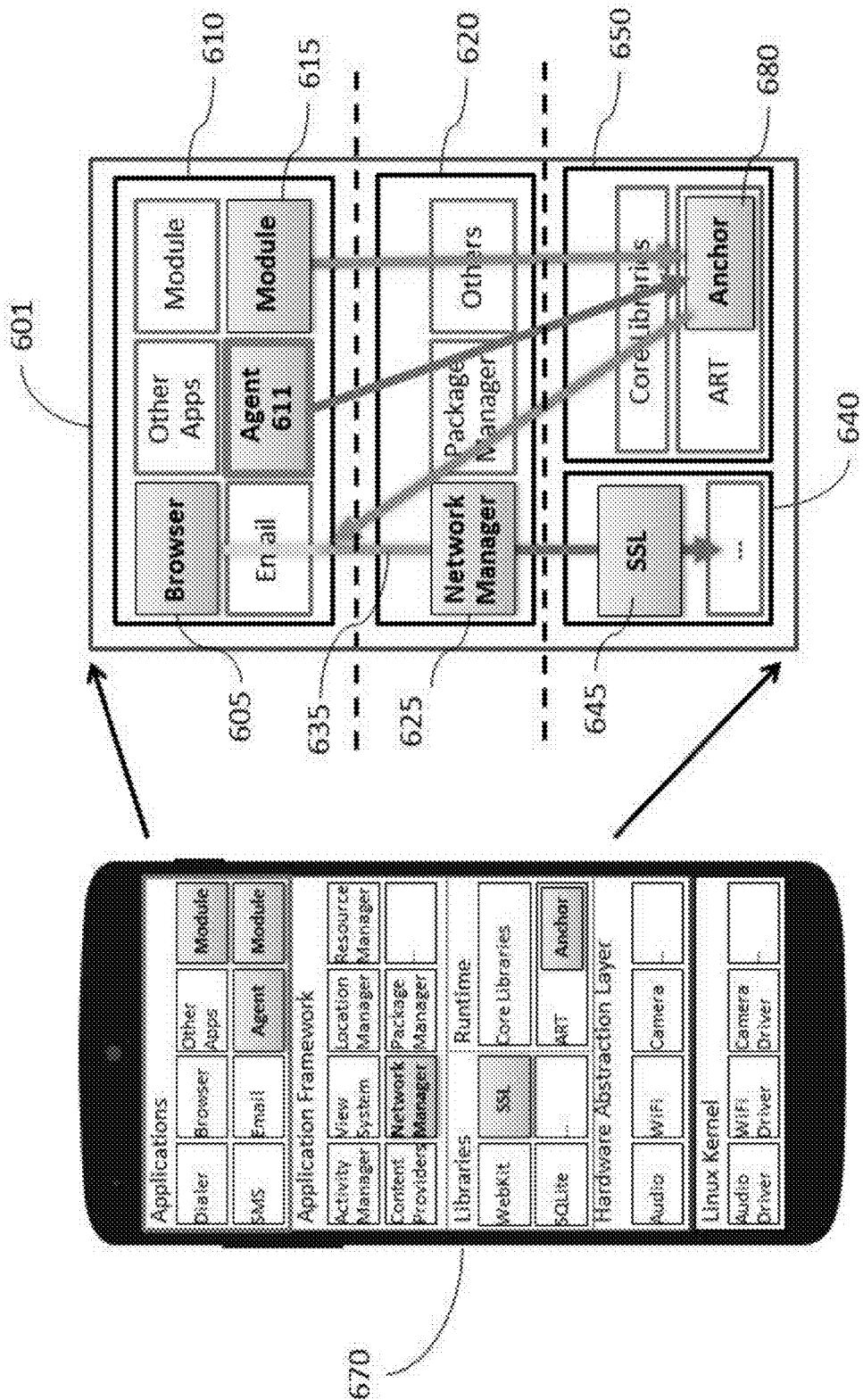
FIG. 6A is an illustration of the Service Layer applied to a mobile application in accordance with some embodiments described herein.
Figure 6B:
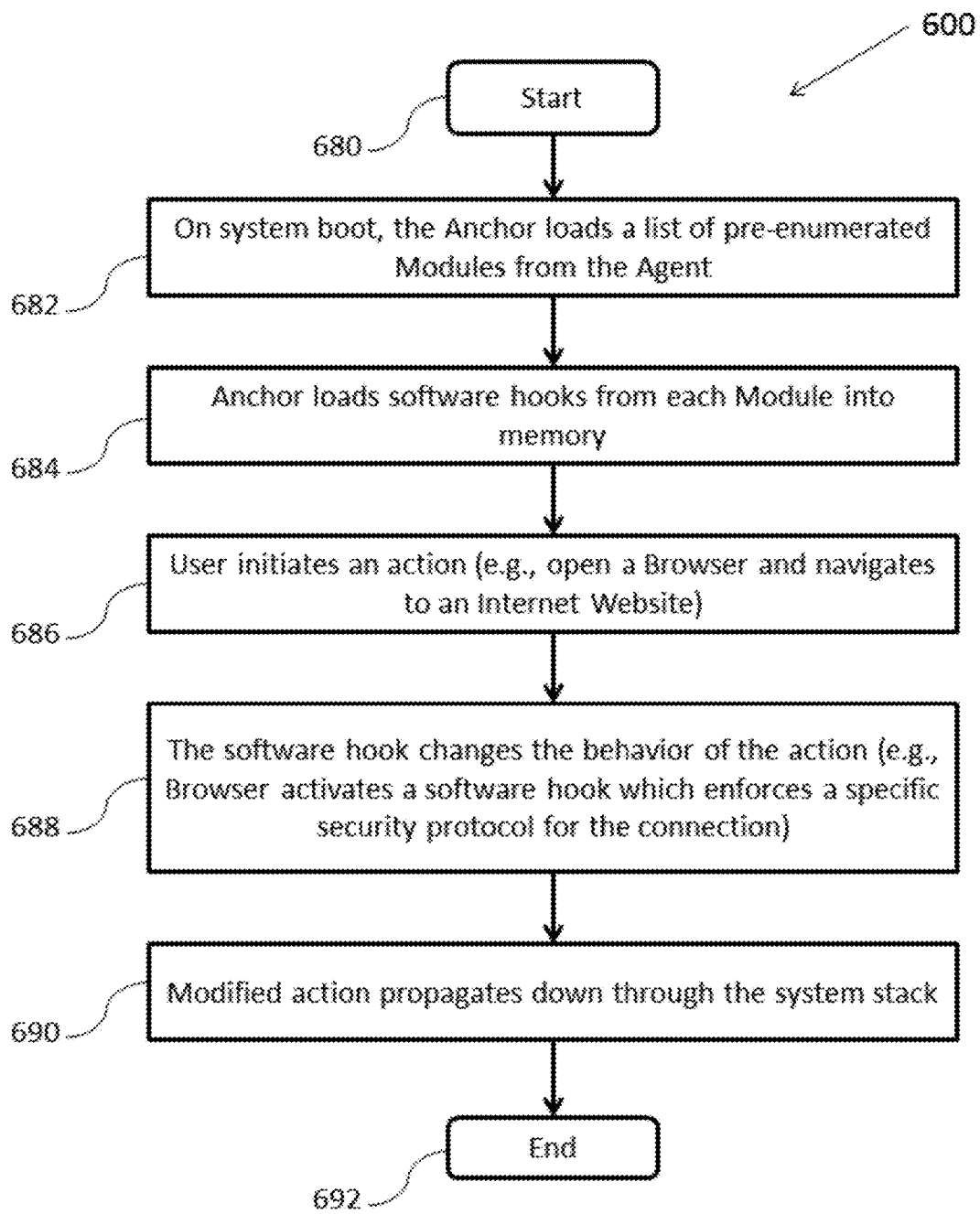
FIG. 6B is a flow diagram illustrating an example of the Service Layer applied to a mobile application in accordance with some embodiments described herein.

FIGS. 6A-6B is an illustration of a use case of the Service Layer concept applied to a mobile application in accordance with some embodiments described herein. Referring to FIG. 6A, the software stack illustrated on the left 670 is an embodiment of a mobile software stack, and the figure on the right 601 is an expanded illustration of software stack layers and their components that are in communication with one or more of the Service Layer components.

Referring to FIG. 6B, the flow chart illustrates how software hooks may be applied to a mobile application in operation. In some embodiments—on system boot—the Anchor 680 may load a list of pre-enumerated SL Modules from the Agent 611 (Step 682). One of the enumerated Modules may be the Module 615. Next, the Anchor may load software hooks from each module into memory (Step 684), such as the Runtime 650. Thus, at Step 684, the software hooks from the SL Module 615 may also be loaded into memory. After the booting sequence is complete, a user may initiate an action to access a specific online website, for example, by opening a browser application 605 and navigating to an Internet website (Step 686). Under this scenario, the software hook from Module 615 may be configured to modify the system behavior of a specific user action (Step 688), for example, when the user attempts to connect to the Internet. Opening an Internet browser application may invoke or activate a software hook which enforces a specific security protocol for the connection with a website (e.g., Module 615). The modified action can propagate down through the software stack (Step 690) (which is also illustrated by the arrow 635), altering the behavior of the app. In the given example, the software hooks are applied to modify IP traffic to enforce Secure Socket Layer (SSL) config.

Boot Up Sequence

Upon booting a mobile device, a hardwired code at a predefined location in the ROM (e.g., Boot ROM) may be executed. This process may load a boot loader code into the RAM and start executing the code. The boot loader code may initialize the necessary memory, clock, or network required to run the kernel. Next, as the kernel is launched, it initializes its various subsystems and may proceed to launch root process or the first process of the system.

Figure 7:
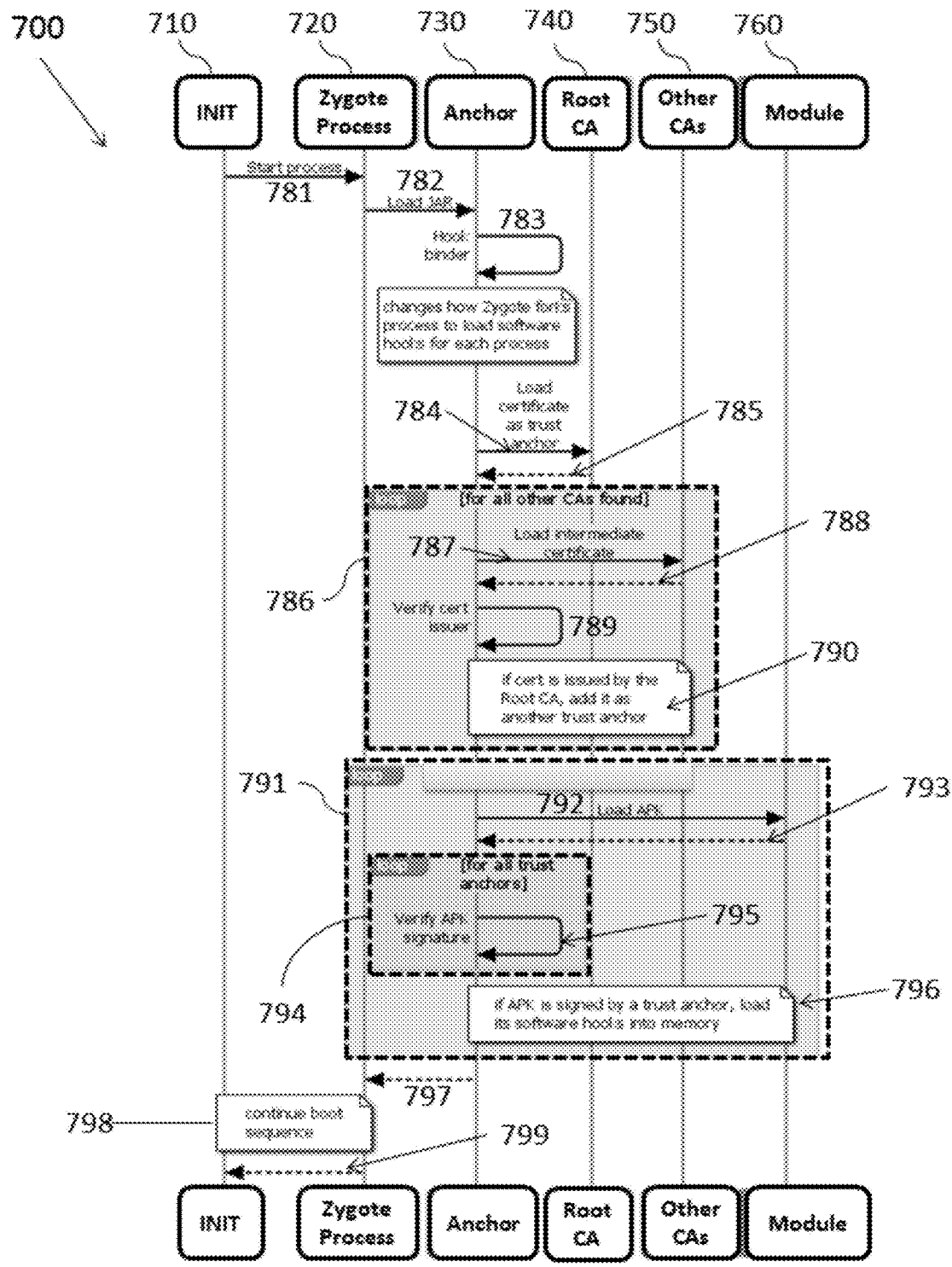
FIG. 7 is a sequence diagram illustrating a boot sequence for a mobile device with the Service Layer installed in accordance with some embodiments described herein.

FIG. 7 is a sequence diagram 700 illustrating a boot up sequence for an OS with the Service Layer components installed in accordance with some embodiments described herein. In some embodiments, the OS is the Android operating system, and the initialization process may be referred to as the "init process" 781. After the init process is invoked 781, a script file (e.g., "/init.rc"), which describes the file system and other parameters that need to be set up, may be executed. The init process 781 may start native daemons. A deamon may refer to a program that runs as a background process, rather than being under the direct control of an interactive user. For example, daemons may serve the function of responding to network requests, hardware activity, or other programs by performing some task. In one embodiment, one of the native daemons can be a Zygote, and the Zygote process 720 may be initiated via an executable located under a specific directory, for example, "/system/bin/app_process". Generally, the Zygote may be responsible for starting and managing applications processes, and may also be referred to as the parent process or the master process. For example, the Zygote may preload any shared libraries and fork off the applications processes for any applications that are started up.

In some embodiments, the Service Layer is installed on the mobile device and is part of the software stack. Installing the Service Layer may involve a process of replacing an existing Zygote process start executable (e.g., "system/bin/app_process") with an extended (i.e., modified or altered) executable. The extended executable may add an additional Java Archive (JAR) (782) to the class path. JAR generally refers to a package file format typically used to aggregate many Java class files and associated metadata and resources into one file to distribute application software or libraries on the Java platform. When the extended executable runs, it may load a JAR file 782 onto a runtime environment such as, for example, the Android Runtime (ART). This process may modify or alter how the Zygote forks processes to load software hooks for each process. For instance, software hooks may be used to modify the binder (783) (which may be the mechanism that is used to start all other apps on the device). Next, a certificate is loaded as a trust anchor 784. Once root certificate is loaded, the device boot sequence may enter a loop sequence, searching for all other certificate authority (CA) certificates. For all the other CA certificates found, intermediate certificates may be loaded 787, and the certificate issuer can be verified 789. If the certificate is issued by the Root CA, it may be added as another trust anchor 790.

Next, the boot sequence may enter a loop sequence 791 searching for any existing SL modules in the system. For each module found in the system, the application packages (e.g., APKs) of the SL modules may be loaded 792. For each trust anchors 794, the system may be configured to verify the APK signature 795. If the APK of the module is signed by a trust anchor, the software hooks included in those SL modules may be loaded into memory 796. Once all the APKs of the SL modules are verified, the sequence may continue with the remaining boot sequence 798.

Figure 8:
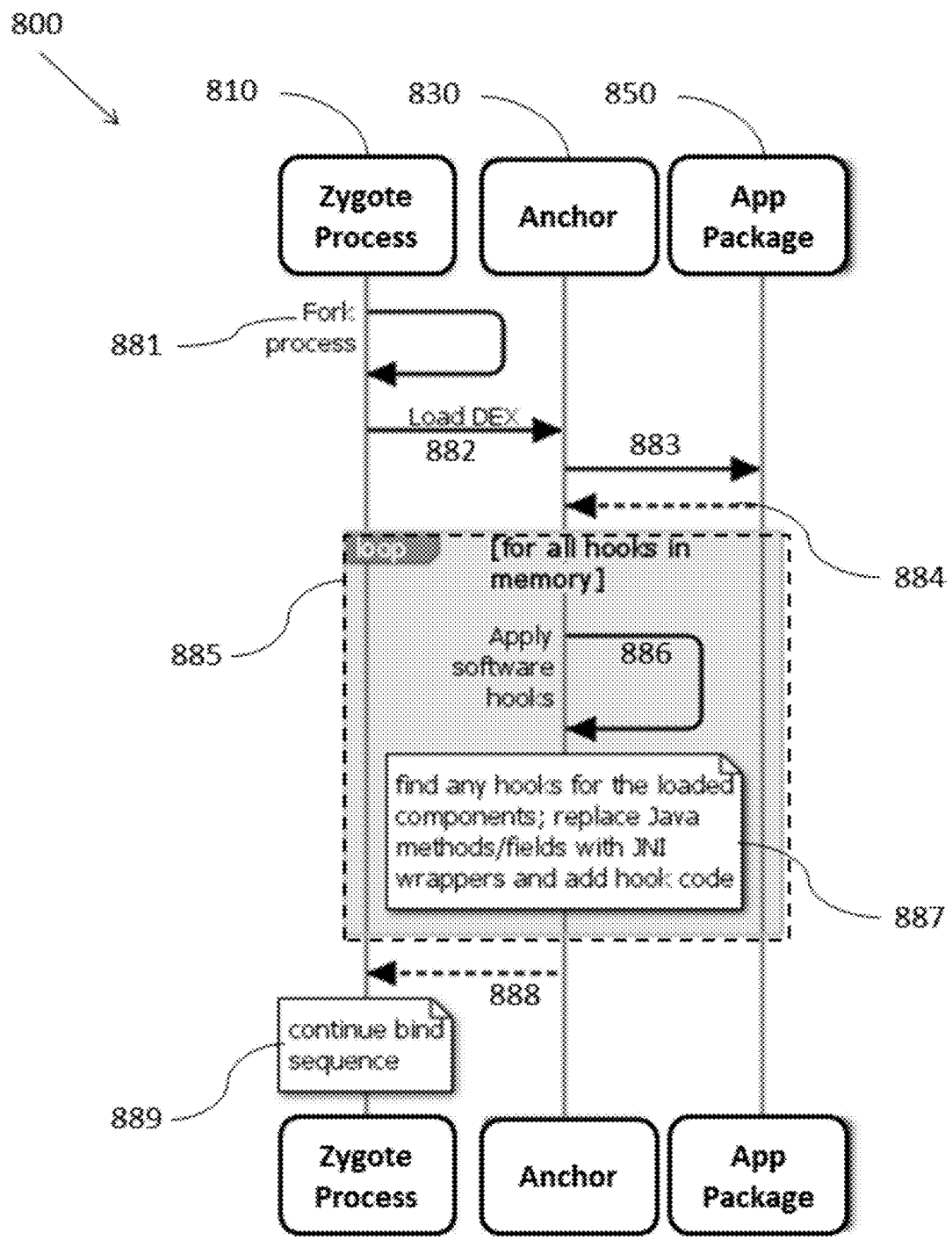
FIG. 8 is a sequence diagram illustrating a mobile application startup sequence with the Service Layer installed in accordance with some embodiments described herein.

FIG. 8 is a sequence diagram illustrating a mobile application startup sequence with the Service Layer installed in accordance with some embodiments described herein. A parent process or a master process, (e.g., the Zygote process 810) may be used to launch an application (app). The parent process may create a child process, which may be a direct copy of the parent process. The child process may load an executable file of an application, and proceed to apply software hooks that may be loaded in memory. The hook codes may be added in place of the original codes. The hook codes may replace the original codes through what is called a "wrapper", which generally is used to describe a class which contains an instance of another class, but which does not directly expose that instance.

In one embodiment, the parent process, such as the Zygote process creates a copy of itself using the "fork" process 881. Next, the app startup sequence may load the Dalvik executable ("DEX") files 882, and initialize the application for execution. For each of the software hooks loaded into memory, the app startup sequence may apply the software hooks 886 by searching the hook targets for the loaded components. Once the targets are identified, the corresponding target Java methods and fields may be replaced with Java Native Interface (JNI) wrappers and the hook code may be added 887. The aforementioned JNI wrappers would redirect those methods or fields to the corresponding ones defined by the software hooks.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Figure 9:
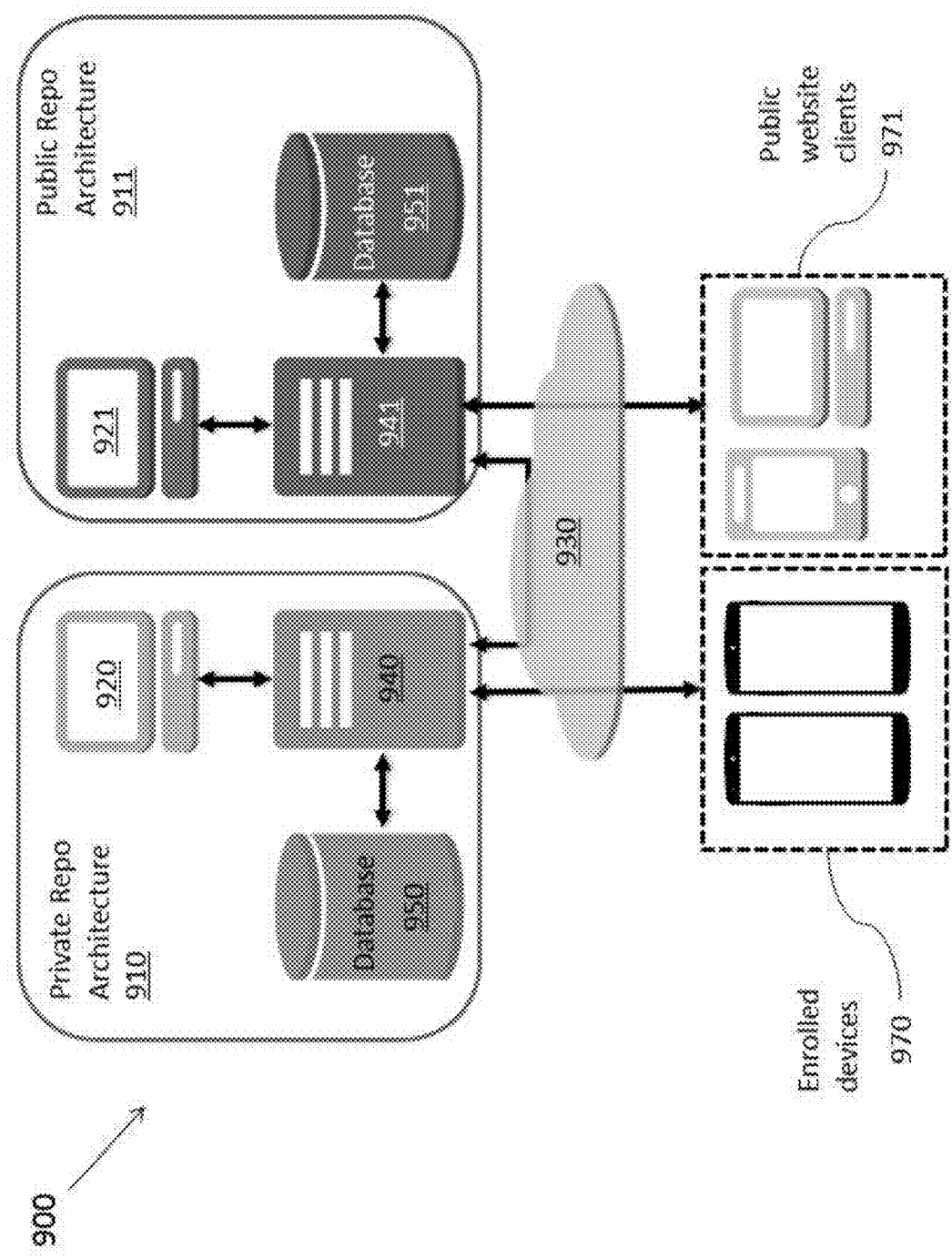
FIG. 9 illustrates an example of a network-based public and private repository architecture for the Service Layer in accordance with some embodiments described herein.

FIG. 9 illustrates an example of network-based public and private repository architecture for the Service Layer in accordance with some embodiments described herein. The public and the private repositories may operate independently, or maybe combined, communicatively coupled, or work in conjunction, to complement the functionality of one another.

Public Repo Architecture

In some embodiments, the public repository may be hosted by a trusted authority, and accessible to the public. The public repository ("public repo") 911 may comprise a server 941 and a database 951. The server 941 may be accessible via the management interface client 921, which may or may not be a web client. For example, the management interface client may provide the administrator with a graphical user interface to view, modify, and/or update the Modules that are stored in the database. The management interface client 921 may also be configured to update and manage the public repo server 941. Public website clients 971 may access the public repos via one or more communication channels 930. For example, the public repository may be accessible over the Internet via web browsers, and the users may use the public website clients to view the repository information.

Private Repo Architecture

In some embodiments, the private repository ("private repo") 910 may be hosted by a private organization. For example, the private repository may be utilized by the private organizations' employees. The private repo 910 may comprise a central web server backend 940 and a database 950. The management interface client 920 may provide a web client to view, manage, and configure one or more enrolled mobile devices 970. In some embodiments, enrolled mobile devices may refer to the mobile devices that are used or utilized by the employees or the mobile devices that may have access to the organization's network or database. The enrolled mobile devices 970 may be running the Agent application, and may be in communication with the private repo 910 via one or more communication channels 930. In some embodiments, the Agent app may be used to authenticate the mobile devices via the repository, download SL Modules, and/or upload device information. The Agent app may also be used to apply policies to the device and/or provide the policy information to other apps on the device. The device information may include, but is not limited to device state, Monitor logs, etc.

Combined Repo Architecture

In other embodiments, the private repo 910 and the public repo 911 may be communicatively coupled to provide a combined repo architecture 900. The private repo ("primary") and the public repo ("secondary") may be interconnected via the network 930, and the primary repo may access SL Modules from other secondary repos. Secondary repos may be highly trusted sources, and SL Modules from the secondary repos may be imported by, for example, the primary repo administrator. The Agent app on devices may provide intermediate CAs for primary and secondary repos.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be shared across a plurality of devices.

Exemplary Operating Environment

Figure 10:
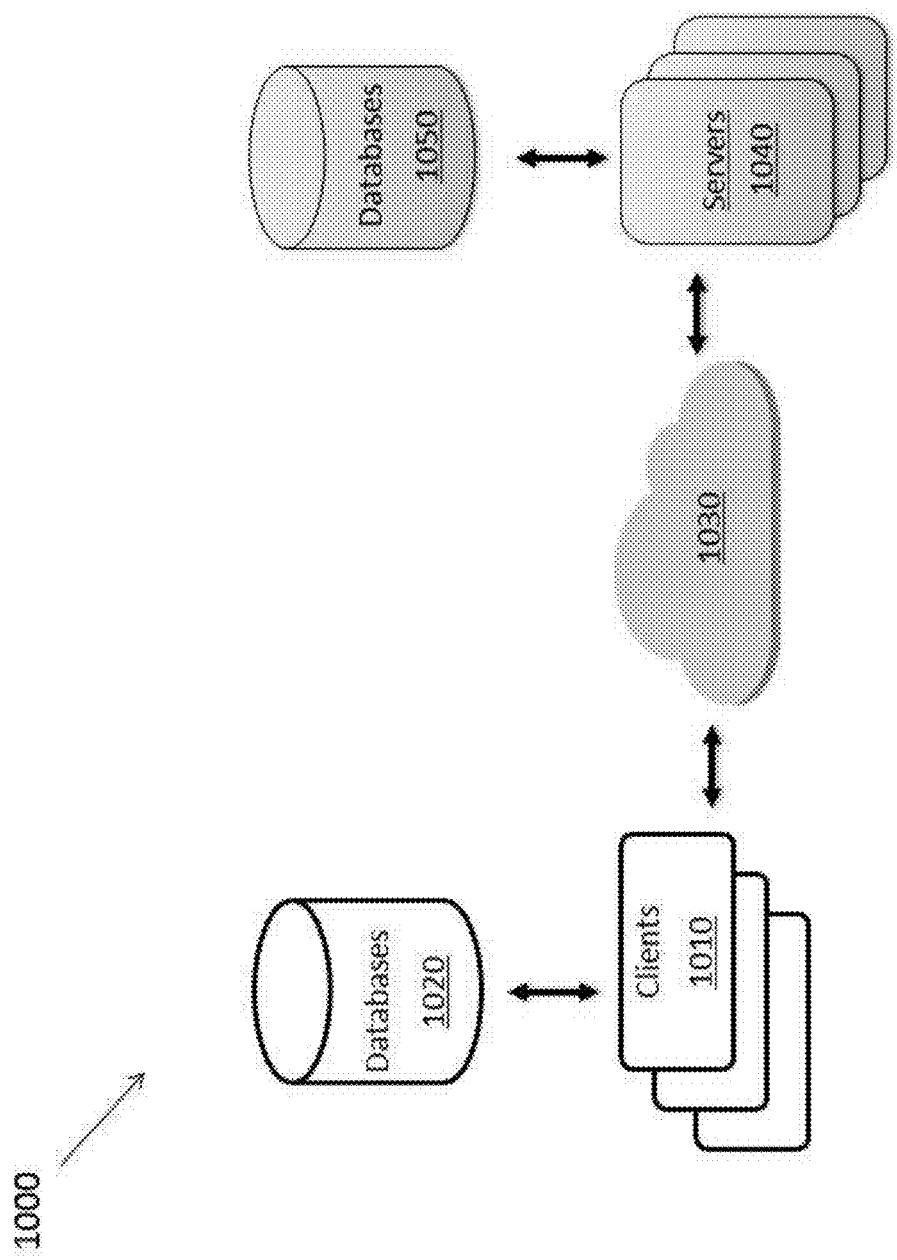
FIG. 10 is a high level schematic block diagram of an exemplary operating environment for managing the Service Layer across the network.

FIG. 10 is a high level schematic block diagram of an exemplary operating environment 1000 for managing the service layer across the network.

The embodiments described herein may be applied to an operating environment 1000 having one or more servers 1040 communicatively coupled through a communication network 1030 to one or more clients 1010. It should be noted that the operating environment 1000 is exemplary and is not intended to suggest any limitation as to the functionality of the embodiments.

Each server 1040 may be communicatively coupled to one or more server databases 1050. A server 1040 may be embodied as a hardware device, a software module, or a combination thereof. The server 1040 may be any type of electronic device, such as, without limitation, a mobile device, a personal digital assistant, a mobile computing device, a tablet, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The server 1040 may also be embodied as a software module having instructions that execute in a single execution path, multiple concurrent execution paths (e.g., thread, process, etc.), or in any other manner.

Each client 1010 may be embodied as a hardware device, a software module, or a combination thereof. A client 1010 may be any type of electronic device, such as, without limitation, a mobile device, a personal digital assistant (PDA), a mobile computing device, a tablet, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. A client 1010 may also be embodied as a software module having instructions that execute in a single execution path, multiple concurrent execution paths (e.g., thread, process, etc.), or in any other manner.

The communication network 1030 facilitates communications between the servers and the clients. The communication network 1030 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators). For example, the communication network 1030 can be the Internet, an internet and/or extranet, or an intranet and/or extranet that is in communication with the Internet.

Each server 1040 and client 1010 may include various types of standard communication elements designed to be interoperable with the communication network 1030, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Computer System

Figure 11:
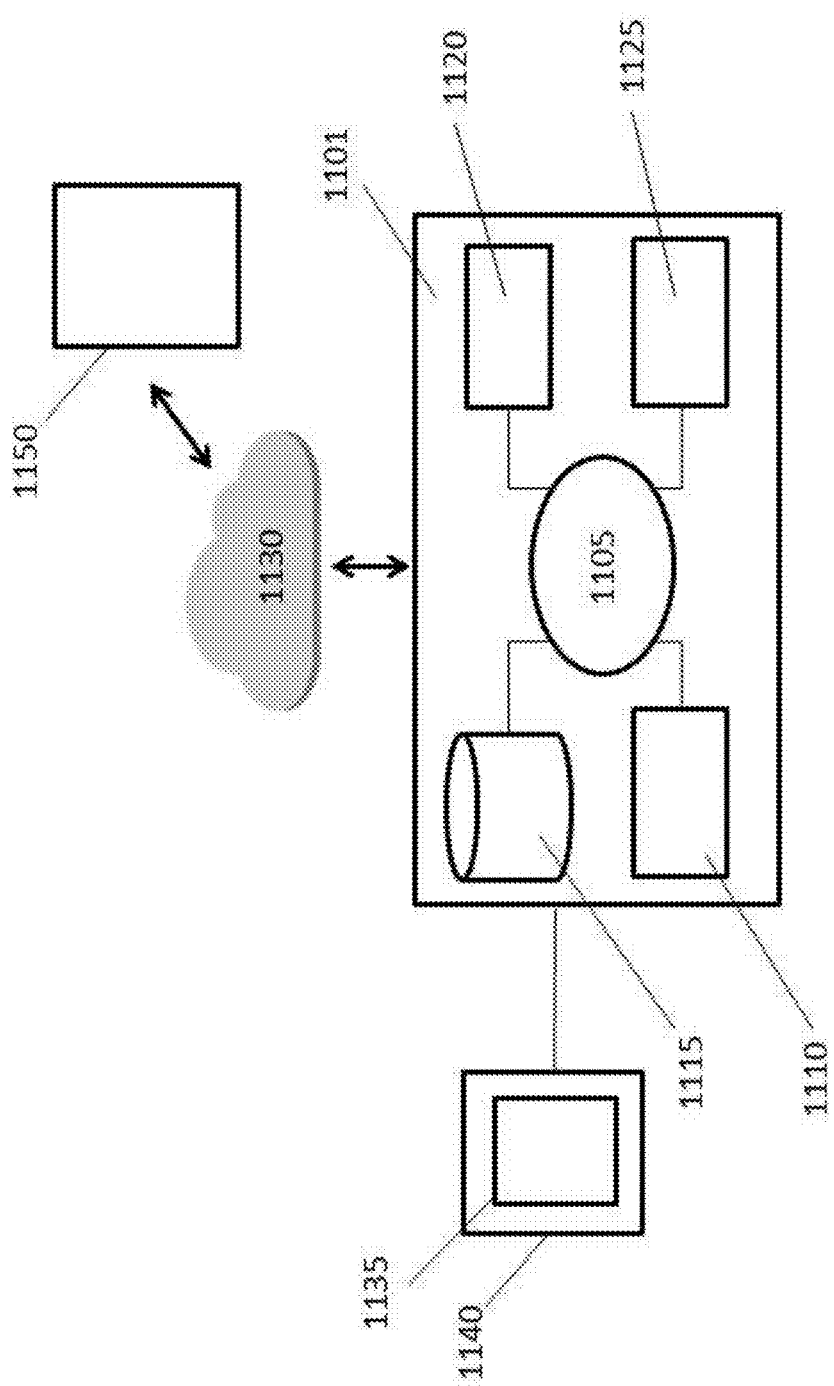
FIG. 11 shows an exemplary computer system that is programmed or otherwise configured to implement methods provided herein.

The present disclosure provides computer systems that are programmed to implement methods of the disclosure. FIG. 11 shows an exemplary computer system 1101 that is programmed or otherwise configured to implement methods provided herein. The computer system 1101 may be programmed or otherwise configured to install and apply software hooks on one or more applications. The computer system 1101 can regulate various aspects of FIGS. 4-9 of the present disclosure, such as, for example, code signature verification of software hooks, automatic enumeration and loading of software hooks. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data.

The computer system 1101 can operate in a networked environment using logical connections to one or more remote computers, such as remote computer(s) 1150. The remote computer(s) 1150 can be a personal computer, a server, a router, a network PC, a workstation, a microprocessor based appliance, a peer device, a smart phone, a tablet, or other network node, and typically includes many of the elements described relative to computer system 1101. Remote computer(s) 1150 may be connected to the computer system 1101 through a communication network 1130. The computer system 1101 can also be in communication with one or more remote computers through the network 1130. For instance, the computer system 1101 can communicate with a remote computer server (e.g., private repo servers 940, private repo servers 941).

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, one or more components of the service layer such as the agent 111, monitor 113, or SL Modules 113, 115. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105. The algorithm can, for example, partially replace existing code of apps and services or inject custom code as the apps and services get executed on the computer system.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method of modifying a behavior of a software application at runtime on a computing device having at least one processor, the method comprising:
   (a) executing an initialization instruction for the computing device, wherein the computing device includes a software stack with a plurality of layers, wherein the plurality of layers includes a service layer, and wherein the service layer includes one or more software modules located in the software stack, whereby the initialization instruction causes the processor to create a parent process modified to load one or more, new or updated software modules as service layer components comprising software hooks, wherein the software hooks are loaded into a memory of the computing device;

(b) launching the software application by executing a fork instruction on the modified parent process, thereby creating a child process that includes instructions associated with applying the one or more software hooks, wherein the fork instruction creates a copy of the modified parent process;

(c) loading into the memory of the computing device an executable file that is associated with the software application;

(d) identifying hook targets from loaded components of the executable file, wherein the identification is based on the instructions associated with applying the one or more software hooks;

(e) applying the one or more software hooks to the hook targets, thereby replacing the identified hook targets with the one or more software hooks, and (f) loading a digital certificate into the memory, prior to launching the software application, wherein the hook targets are configured to use the digital certificate verify code signatures of the one or more new or updated software modules.

2. The method of claim 1, further comprising: verifying each of the one or more, new or updated software modules, loading into the memory software hooks associated with the verified software modules.

3. The method of claim 1, wherein the code signatures are verified using a secure public key infrastructure (PKI).

4. The method of claim 1, wherein the computing device is a mobile device.

5. The method of claim 1, further comprising:
detecting a new or updated software module in a remote software module repository, wherein the remote software module repository is communicatively coupled to the computing device; and
installing the new or updated software module on the computing device.

6. The method of claim 4, wherein the mobile device is an Android device running an Android operating system.

7. A system, comprising:
(a) one or more processors;
(b) a memory coupled to the processors comprising instructions executable by the processors to modify the behavior of a software application at runtime on an operating system installed on a computing device, the processors being operable when executing the instructions to:
(1) execute an initialization instruction for the computing device, wherein the computing device includes a software stack with a plurality of layers, wherein the plurality of layers includes a service layer, and wherein the service layer includes one or more software modules located in the software stack, whereby the initialization instruction causes the processor to create a parent process modified to load one or more, new or updated software modules as service layer components comprising software hooks, wherein the software hooks are loaded into a memory of the computing device;
(2) launch the software application by executing a fork instruction on the modified parent process, thereby creating a child process that includes instructions associated with applying the one or more software hooks, wherein the fork instruction creates a copy of the modified parent process;
(3) load into the memory of the computing device an executable file that is associated with the software application;
(4) identify hook targets from loaded components of the executable file, wherein the identification is based on the instructions associated with applying the one or more software hooks;
(5) apply the one or more software hooks to the hook targets, thereby replacing the identified hook targets with the one or more software hooks; and
(6) load a digital certificate into the memory, prior to launching the software application, wherein the hook targets are configured to use the digital certificate to verify code signatures of the one or more, new or updated software modules.

8. The system of claim 7, further comprising: verifying each of the one or more, new or updated software modules, loading into the memory software hooks associated with the verified software modules.

9. The system of claim 7, wherein the code signatures are verified using a secure public key infrastructure (PKI).

10. The system of claim 7, wherein the computing device is a mobile device.

11. The system of claim 7, further comprising;
one or more servers communicatively coupled to the computing device, configured to cause the computing device to download the one or more, new or updated software modules.

12. The system of claim 10, wherein the mobile device is an Android device running an Android operating system.

13. At least one non-transitory computing device-readable medium comprising instructions stored thereon wherein the instructions, in response to execution by a computing device, cause the computing device to:
(a) execute an initialization instruction for the computing device, wherein the computing device includes a software stack with a plurality of layers, wherein the plurality of layers includes a service layer, and wherein the service layer includes one or more software modules located in the software stack, whereby the initialization instruction causes the processor to create a parent process modified to load one or more, new or updated software modules as service layer components comprising software hooks, wherein the software hooks are loaded into a memory of the computing device;
(b) launch a software application by executing a fork instruction on the modified parent process, thereby creating a child process that includes instructions associated with applying the one or more software hooks, wherein the fork instruction creates a copy of the modified parent process;
(c) load into the memory of the computing device an executable file that is associated with the software application;
(d) identify hook targets from loaded components of the executable file, wherein the identification is based on the instructions associated with applying the one or more software hooks;
(e) apply the one or more software hooks to the loaded components of the executable file, thereby replacing the identified hook targets with the one or more software hooks, and
(f) load a digital certificate into the memory, prior to launching the software application, wherein the hook targets are configured to use the digital certificate to verify code signatures of the one or more, new or updated software modules.

14. The computing device-readable medium of claim 13, wherein determining whether to load the software hooks into the memory of the computing device further comprises:
verifying each of the one or more, new or updated software modules, loading into the memory the software hooks associated with the verified software modules.

15. The computing device-readable medium of claim 13, wherein the code signatures are verified using a secure public key infrastructure (PKI).

16. The computing device-readable medium of claim 13, wherein the computing device is a mobile device.

17. The computing device-readable medium of claim 16, wherein the mobile device is an Android device running an Android operating system.

* * * * *